June 12, 1928.

J. DE LA CIERVA 1,673,233

AIRCRAFT WITH ROTATIVE WINGS

Filed Nov. 10, 1926

Inventor.
J. de la Cierva
by Futhurstuhand & Co
Attys.

Patented June 12, 1928.

1,673,233

UNITED STATES PATENT OFFICE.

JUAN DE LA CIERVA, OF MADRID, SPAIN.

AIRCRAFT WITH ROTATIVE WINGS.

Application filed November 10, 1926, Serial No. 147,572, and in Great Britain November 25, 1925.

This invention relates to aircraft of the type embodying freely rotative wings such for example as are described in my U. S. patent specification No. 1,590,497 and has for its primary object the provision of arrangements whereby the wing system may be folded or collapsed into relatively small compass for the purposes for instance of storage or of transport in aircraft carrying ships.

The method of hinging the wings to a rotative member constituting the common centre of rotation enables the wings to be swung upwards in planes passing approximately through the axis of rotation, and in this manner the wings may be brought together in a more or less vertical position in prolongation of the axis of rotation.

In one construction according to the present invention the shaft or other member constituting the centre of rotation is jointed, hinged or otherwise movably mounted to swing about a substantially horizontal axis in such a manner that the wings, brought together as aforesaid, may assume a position close to the body of the aircraft e. g. along, and if desired, supported by the upper surface of the fuselage.

In some cases where the wings are flexibly jointed to swing about an axis approximately perpendicular to the axis of the primary articulation for the purpose of permitting the wings some lateral movement during flight, another method of folding or collapsing the wings in accordance with the present invention consists in detaching the connections serving to maintain the wings in symmetrical relation in the plane of rotation, and swinging those wings which extend laterally from the body of the aircraft into a position as nearly as possible parallel with the longitudinal axis of the fuselage.

Figs. 1 and 2 of the accompanying drawings illustrate an example of the first-mentioned form of construction.

Fig. 5 is a plan view of a wing system illustrating the alternative form of construction above referred to.

Figure 1:
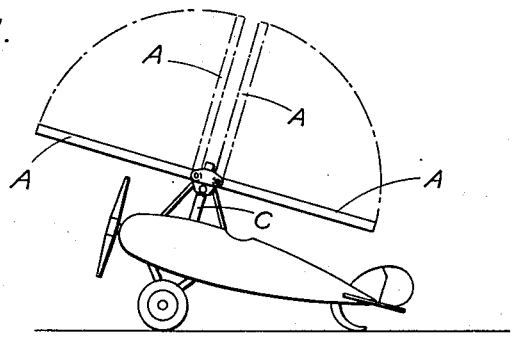
Figure 2:
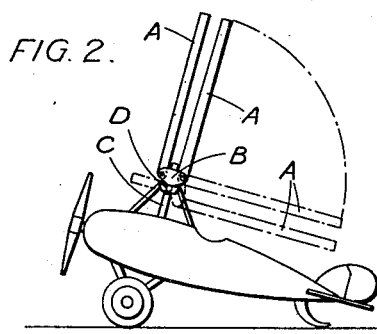

In Figs. 1 and 2, the wings A by reason of their being hingedly jointed to their rotative supporting member B may be swung upwardly to the position indicated by the broken lines in Fig. 1. For clearness of illustration only two wings are shewn but it will be understood that others (a usual number being four, or in some cases three) may be similarly raised to this more or less vertical position.

The shaft C, on which the wing supporting member B rotates is mounted in substantially horizontal bearings D so that the entire wing system may be swung rearwardly to the position shown in broken lines in Fig. 2, with all wings lying substantially parallel to the longitudinal axis of the aircraft, and presenting a compact and easily housed structure.

Figure 3:
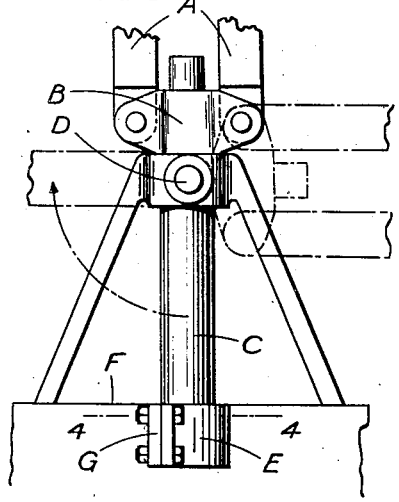
Fig. 3 is a detail view to an enlarged scale of a method of hingedly mounting and securing the shaft.
Figure 4:
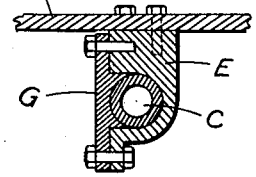
Fig. 4 is a sectional view taken on the line 4—4 Fig. 3.

As shewn in more detail in Figs. 3 and 4, the shaft in its upright position is received by a bracket E bolted to a convenient part F of the fixed body structure of the aircraft, and is then held in position by a retaining piece G secured by bolts to the bracket E. It will be obvious however that any other convenient form of retaining means may be employed.

Figure 5:
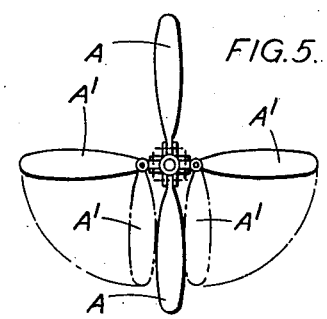

In the construction shown in Fig. 5 two oppositely disposed wings $A^1$ are provided with secondary hinge joints H perpendicular to their ordinary horizontal joints such that they may be swung to the position indicated in broken lines close alongside one of the wings A, the latter wings at such time lying parallel to the longitudinal axis of the aircraft.

For flight, the folding wings $A^1$ may be held in their extended position in any suitable manner preferably by being connected to the horizontally rigid wings by yielding or elastic bracing members such as flexible cables either embodying an extensible element or left slack and carrying weights swung outward centrifugally, and thereby tautened during rotation.

Where the system comprises three wings only, a construction similar to that shown in Fig. 5 may be employed, two of the wings being furnished with vertical hinge joints about which they are swung rearwardly, when to be folded, to positions alongside and parallel to each other, the remaining horizontally rigid wing pointing forwards.

What I claim is:—

1. In aircraft, a freely rotative wind driven wing system capable of being folded for storage and comprising a shaft pivotally mounted in relation to the body of the aircraft, a member rotatably mounted on said shaft, a plurality of wings hingedly jointed to said rotative member so that said wings may be swung upwards from substantially horizontal to substantially vertical positions, a bracket secured to the body of the aircraft and adapted to receive the shaft, and releasable means co-operating with said bracket to hold the shaft with its axis substantially vertical but upon release permitting said shaft to swing to a substantially horizontal position in which the wings lie close to the body of the aircraft.

2. In aircraft, a freely rotative wind driven wing system capable of being folded for storage and comprising a shaft, a shaft-supporting structure secured to the body of the aircraft and in which said shaft is pivoted to turn about a horizontal axis, a member rotatably mounted on said shaft, a plurality of wings hingedly jointed to said rotative member so that said wings may be swung upwards from substantially horizontal to substantially vertical positions, a bracket secured to the body of the aircraft and adapted to receive the shaft, and releasable means cooperating with said bracket to hold the shaft with its axis substantially vertical but upon release permitting said shaft to swing to a substantially horizontal position in which the wings lie close to the body of the aircraft.

JUAN de la CIERVA.